(12) United States Patent
Roth (10) Patent No.: US 9,333,981 B2
(45) Date of Patent: May 10, 2016

(54) SEMI-RIGID TRANSPARENT PROTECTIVE SHIELD FOR JOGGING STROLLER AND METHOD OF SHIELDING OCCUPANT

(76) Inventor: Charles J. Roth, Hudson, WI (US)

( * ) Notice: Subject to any disclaimer, the term of this patent is extended or adjusted under 35 U.S.C. 154(b) by 2402 days.

(21) Appl. No.: 12/004,172

(22) Filed: Dec. 19, 2007

(65) Prior Publication Data

US 2009/0160149 A1    Jun. 25, 2009

(51) Int. Cl.
  *B62B 9/12* (2006.01)
  *B62B 9/14* (2006.01)
(52) U.S. Cl.
  CPC ......................................... *B62B 9/14* (2013.01)
(58) Field of Classification Search
  USPC .............. 280/642, 647, 650, 657, 658, 47.25, 280/47.38; 296/77.1
  See application file for complete search history.

(56) References Cited

U.S. PATENT DOCUMENTS

| | | | | |
|---|---|---|---|---|
| 3,227,484 | A * | 1/1966 | Merclean | 296/77.1 |
| 3,843,982 | A | 10/1974 | Lane et al. | |
| 3,997,212 | A | 12/1976 | Tesch | |
| 4,082,346 | A | 4/1978 | Perreault et al. | |
| 4,087,110 | A | 5/1978 | Vetter | |
| 4,269,445 | A | 5/1981 | Gager, Jr. | |
| 4,488,750 | A | 12/1984 | Gerber | |
| 4,533,170 | A * | 8/1985 | Banks et al. | 296/77.1 |
| 4,582,355 | A * | 4/1986 | Hall | 296/77.1 |
| 4,830,423 | A | 5/1989 | Nebu et al. | |
| 5,110,174 | A | 5/1992 | Andree | |
| 5,184,865 | A * | 2/1993 | Mohtasham et al. | 296/77.1 |
| 5,188,380 | A * | 2/1993 | Tucek | 280/30 |
| 5,224,720 | A | 7/1993 | Chaw et al. | |
| 5,758,889 | A * | 6/1998 | Ledakis | 280/47.38 |
| 5,785,333 | A * | 7/1998 | Hinkston et al. | 280/204 |
| D424,483 | S * | 5/2000 | Tripodi | D12/133 |
| 6,155,628 | A * | 12/2000 | Williams | 296/97.21 |
| 6,173,725 | B1 | 1/2001 | Garth | |
| 6,217,099 | B1 * | 4/2001 | McKinney et al. | 296/77.1 |
| 6,224,073 | B1 * | 5/2001 | Au | 280/47.38 |
| 6,330,898 | B1 | 12/2001 | Chang | |
| 6,402,225 | B1 * | 6/2002 | Hsia | 296/107.02 |

(Continued)

OTHER PUBLICATIONS

Baby Jogger, Wind & Canopy Instructions, Richmond, VA, no known date.

*Primary Examiner* — Katy M Ebner
(74) *Attorney, Agent, or Firm* — Donna L. Angotti; The Law Offices of Donna L. Angotti (57) ABSTRACT

A semi-rigid transparent shield for a jogging stroller provides occupant protection from wind, rain and snow. The device quickly and easily attaches to, and detaches from a jogging stroller. The semi-rigid transparent shield does not crease or wrinkle, maintaining excellent visibility for stroller occupant. The shield also provides protection from air borne road debris caused by passing vehicles. The shield pivots for easy loading and unloading the jogging stroller. The shield is under compression to add resistance to external forces. A sheet assembly attaches to a frame assembly forming a geometric arch adding stability and resistance to external forces. A method to provide protection of a child in a jogging stroller by shielding the child with a material that does not wrinkle or crease is also contemplated. The occupant space is substantially sealed from the outdoor elements. A method of shielding a child in a jogging stroller by flexing a sheet assembly of a semi-rigid material into a frame assembly is also disclosed. Further, the shield is flexed in the mounting hardware.

26 Claims, 6 Drawing Sheets

(56) References Cited

U.S. PATENT DOCUMENTS

| | | |
|---|---|---|
| 6,598,927 B2 | 7/2003 | Kurohori et al. |
| 6,659,526 B2 | 12/2003 | Strong |
| 6,736,441 B1 | 5/2004 | Barber et al. |
| 6,752,447 B2 | 6/2004 | Gagne |
| 6,786,526 B1 | 9/2004 | Blalock |
| 6,808,219 B2 | 10/2004 | Barber et al. |
| 6,834,905 B2 | 12/2004 | Okamoto et al. |
| 6,877,763 B2 | 4/2005 | Ulrich |
| D510,902 S | 10/2005 | Erskine et al. |
| 7,048,333 B2 * | 5/2006 | Martinez .................. 297/184.11 |
| 7,090,242 B1 * | 8/2006 | Sheinall et al. ............... 280/657 |
| 7,150,499 B2 * | 12/2006 | McGregor ............... 297/184.13 |
| 2005/0046134 A1 * | 3/2005 | Gracias et al. ............. 280/47.38 |
| 2006/0290107 A1 * | 12/2006 | Powers ........................ 280/658 |
| 2007/0080519 A1 * | 4/2007 | Murdock ...................... 280/650 |
| 2008/0012258 A1 * | 1/2008 | Townsend .................. 280/47.38 |

* cited by examiner

SEMI-RIGID TRANSPARENT PROTECTIVE SHIELD FOR JOGGING STROLLER AND METHOD OF SHIELDING OCCUPANT

BACKGROUND OF THE INVENTION

The present invention relates to jogging stroller accessories generally, and specifically to a shield for an infant or young child on an outing in otherwise uncomfortable climate conditions.

Infants and young children benefit greatly from the fresh air and visual stimulation of a stroll in the outdoors. Perhaps even more, the caregiver benefits from the exercise and change of scenery offered by a walk or run outside. Especially in the cooler months of the year when cold wind, rain or snow would be unbearable for an exposed infant or young child, the present invention makes it possible to experience the outdoors.

Prior to the present invention's availability, adding the previously described protection to a jogging stroller could only be accomplished (seemingly the only market option) with a flexible transparent plastic canopy such as the product called the Baby Jogger™ Wind and Rain Canopy for a stroller. The date of the introduction of the Baby Jogger™ canopy is not known to the inventor and the Baby Jogger™ canopy may not be prior art to the invention. While this type does provide some protection, it suffers from deficiencies.

Traditional (non-jogging) strollers are disclosed in U.S. Pat. No. 6,173,725 to Garth, U.S. Pat. No. 6,402,225 to Hsia, U.S. Pat. No. 5,224,720 to Chaw, U.S. Pat. No. 6,217,099 to McKinney, U.S. Pat. No. 6,330,898 to Chang, and U.S. Pat. No. 4,582,355 to Hall. U.S. Pat. No. 6,155,628 to Williams discloses a sunshade for a jogging stroller. Windshields for vehicles are disclosed in U.S. Pat. No. 4,082,346 to Perreault et al., U.S. Pat. No. 4,087,110 to Vetter, U.S. Pat. No. 4,269,445 to Gager, U.S. Pat. No. 4,488,750 to Gerber, U.S. Pat. No. 6,659,526 to Strong, and U.S. Pat. No. 6,808,219 to Barber. The motorcycle or snowmobile windshield of Vetter is flexed to insert.

SUMMARY OF THE INVENTION AND OBJECTS OF PRESENT INVENTION

A simple semi-rigid plastic shield attaches to the structure of a jogging stroller. It attaches (and detaches) quickly and easily. Mounting hardware is attached to the stroller frame. This hardware may be left on the frame indefinitely, as it does not interfere with normal use. Or, it may be easily removed if the jogger shield will not be needed for extended periods of time. Once the hardware is installed, the shield may be attached in seconds (and removed in a like amount of time). In the preferred embodiment, the shield need not be removed to allow the occupant in and out of the stroller seat. The shield simply pivots up and out of the way.

Most jogging strollers on the market today have an integrated canopy with two or more positions. The most common positions are 1) extended forward over the occupant, and 2) retracted back. The present invention could take advantage of this canopy by tucking under the forward-most edge of the canopy when in the extended-forward position. This provides the occupant complete coverage from rain or snow. For jogging strollers without a canopy, the present invention includes a flexible nylon-like material (or a clear flexible plastic) that is attachable (or permanently attached) at the top of the shield. The nylon or plastic material has a simple tie-down strap (or other attaching device) for securing at, or near, the stroller handle. Like the canopy, this also seals the occupant space at the top of the shield. In fact, this can seal the occupant space better than the integral stroller canopy.

The bottom of the shield can be left open for ventilation, or covered in a similar way as the top. A flexible nylon-like or flexible plastic material can connect to the lower portion of the shield. It is secured to the stroller with a simple tie-down strap (or other attaching device). This provides additional protection near the occupant's feet. Note that most of the open space at the bottom is typically filled with the occupant's shoes or boots, eliminating the need for additional protection near the feet.

An object of the present invention is to provide a shield as an accessory for a jogging stroller that protects the stroller occupant from wind, rain, snow and air borne road debris.

Another object of this invention is to provide a shield that quickly attaches and detaches from the stroller so as not to deter its use.

Another object of this invention is to provide a shield that does not obstruct or impair the visibility of the stroller occupant.

Another object of this invention is to provide a shield that reasonably seals the occupant space, for example, at the top and bottom, and along both sides of the stroller.

Another object of this invention is to provide a shield that is light weight, low cost, and easy to manufacture.

Another object is to provide a shield that quickly and easily moves out of the way for loading and unloading the stroller occupant.

Another object is to provide quick and easy installation and removal of the shield by mounting hardware, for example.

Another object is to prevent damage or disfigurement of the stroller frame and/or its nylon coverings.

In general, in a first aspect, the invention features a shield for a jogging stroller, comprising a semi-rigid substantially see-through material, the material not subject to wrinkles or creasing. The shield substantially seals an occupant space from outdoor conditions.

In a second aspect, the invention features a shield for a jogging stroller, comprising a sheet assembly of a semi-rigid substantially see-through material; and a frame assembly; the sheet assembly compliant to a compressive force and compressed to fit on the frame assembly, the compressed fit creating a geometric arch in the material that adds to resistance to external forces. The shield substantially seals an occupant space from outdoor conditions.

In a third aspect, the invention features a method of providing protection for an occupant of a jogging stroller, comprising: shielding the occupant with a semi-rigid substantially see-through material, the material not subject to wrinkles or creasing. The shield substantially seals an occupant space from outdoor conditions.

In a fourth aspect, the invention features a method of shielding an occupant of a jogging stroller, comprising: simultaneously compressing a sheet assembly of a semi-rigid substantially see-through material onto a frame assembly; creating a geometric arch in the material; and adding to resistance to external forces. The shield substantially seals an occupant space from outdoor conditions.

In a fifth aspect, the invention features a method of shielding an occupant of a jogging stroller, comprising: simultaneously compressing a shield with a semi-rigid substantially see-through material into mounting hardware secured to a jogging stroller; creating a geometric arch in the material; and adding to resistance to external forces. The shield substantially seals an occupant space from outdoor conditions.

Further features and advantages of the invention will become evident to one skilled in the art upon reading of the detailed description of the invention, which is given below by way of example only and with reference to the accompanying drawings.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE PREFERRED EMBODIMENTS

The present invention relates to a semi-rigid transparent protective shield. The shield provides protection from wind, rain, snow, and road debris, thus making it feasible to take an infant or young child for an outing in otherwise uncomfortable climate conditions. The semi-rigid sheet offers improved visibility over the more common rain/wind plastic canopy, and provides a secure seal against the elements along the sides of the stroller.

A flexible transparent plastic canopy such as the product called the Baby Jogger™ Wind and Rain Canopy for a stroller, provides some protection; however suffers two primary deficiencies: 1) visibility is impaired and/or distorted due to the inherent wrinkles and creases in the plastic, and 2) the plastic only loosely drapes the sides of the stroller, not providing a positive seal against the elements; particularly a cold winter wind, and/or possibly debris. A flexible transparent plastic canopy might also "cloud" with age.

The present invention attaches quickly and easily when the outside conditions require the protection offered. The minimal effort required to attach the present invention to the stroller does not deter the use of the device. Then, when outdoor conditions permit a stroll without the protective shield, the device detaches just as quickly and easily. Consumers frequently buy a device and do not use it because of the difficulty of attachment and detachment. The present invention does not have this disadvantage.

Further, the semi-rigid transparent nature of the present invention provides much improved visibility over stroller canopies of the flexible plastic type. Flexible plastic protective covers are often creased and wrinkled, thus limiting and/or distorting the view through the cover. Many young children will complain when their view is obstructed or impaired. Such complaining can be yet another deterrent for a much needed stroll outdoors.

Regarding the more traditional (non-jogging) stroller, many more types of covers have been patented. None of these designs, however, provide all of the form, fit and function of the present invention. Some, such as U.S. Pat. No. 6,173,725 to Garth and U.S. Pat. No. 6,402,225 to Hsia provide partial protection against wind. Others, such as U.S. Pat. No. 5,224,720 to Chaw, provide partial protection against rain. Still others, U.S. Pat. No. 6,217,099 to McKinney, U.S. Pat. No. 6,330,898 to Chang, and U.S. Pat. No. 4,582,355 to Hall provide (seemingly) full protection against wind and rain. None, however, offer the improved visibility of the self-supporting semi-rigid plastic of the present design. Nor would any of these readily fit or adapt to a jogging stroller, providing a reasonable seal from the elements.

U.S. Pat. No. 6,155,628 to Williams discloses a sunshade that pivots at the top but the sides are open and the shield does not protect against wind, rain and snow. U.S. Pat. No. 6,877,763 to Ulrich uses a semi-rigid thermoplastic canopy, pivotally mounted to the side members of the stroller. However, this patent provides protection from the sun, primarily. It would not provide protection from wind, rain and snow. Further, the thermoplastic sheet would need to be opaque to shade the sun. The present invention is substantially see-through or transparent.

The Ulrich Patent shows a pivoting shield but is designed for a traditional baby carriage. It is not meant for frequent detachment and attachment. It does not completely cover the occupant and is not used with a jogging stroller.

A similar "fit" argument can be made for all other types of windshields described in a variety of patents. For example, motorcycles, snowmobiles, ATVs and other vehicles have various windshields available. See U.S. Pat. No. 4,082,346 to Perreault et al., U.S. Pat. No. 4,087,110 to Vetter, U.S. Pat. No. 4,269,445 to Gager, U.S. Pat. No. 4,488,750 to Gerber, U.S. Pat. No. 6,659,526 to Strong, and U.S. Pat. No. 6,808,219 to Barber. Vetter's windshield is flexed to insert but is for a snowmobile or motorcycle. It does not seal the occupant space or pivot. It is not easily attached or removed and breaks away under impact of accident. Some of the vehicle windshields claim to be removable or retractable. None, however, would readily fit a jogging stroller. Nor would these designs quickly and easily attach to, or detach from a jogging stroller.

Referring now to the drawings, the invention will be described according to an embodiment of the invention. The same reference numerals designate the identical parts throughout the drawings.

Figure 1:
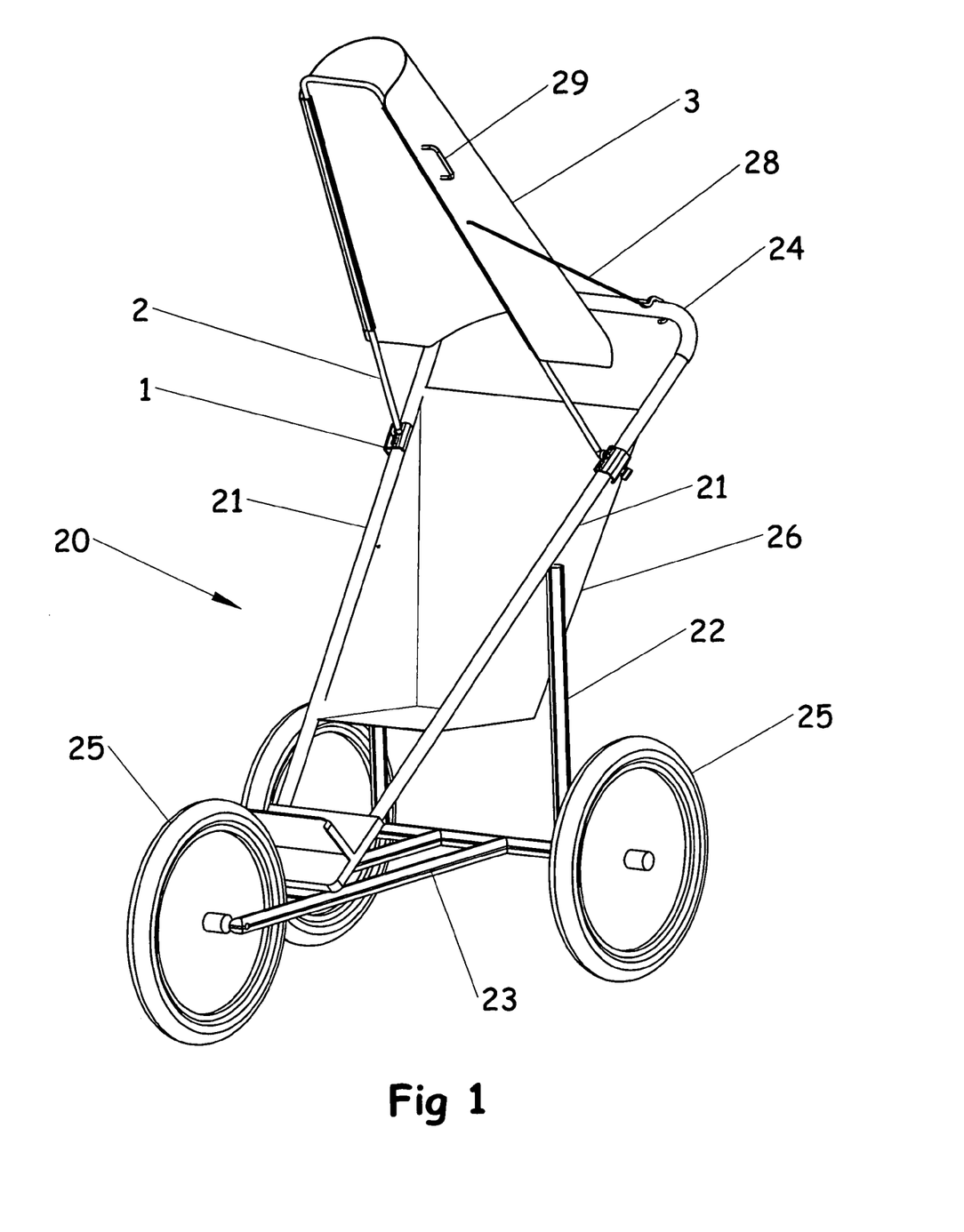
FIG. 1 is a perspective view of the present invention attached to a jogging stroller with no sun canopy, the invention shown in the load/unload position.

FIG. 1—Present Invention on Jogging Stroller, Load/Unload Position

FIG. 1 shows a typical jogging stroller with the present invention attached. The present invention is shown in the preferred embodiment. A semi-rigid clear thermoplastic sheet assembly 3 is attached to a lightweight frame assembly 2. When the sheet assembly is snapped onto the frame assembly, the two together will be referred to as the "shield". The shield sets into mounting hardware 1 that is attached to the stroller frame 21. The frame assembly 2 and mounting hardware 1, together, make a pivoting joint about which the shield pivots up and down. The shield is shown in the up position. The shield is pivoted to the up position for loading or unloading an occupant. The shield is held in the up position with an elastic cord and hook 28 which is fixed, at one end, to the side of the shield. Handle 29 facilitates moving the shield up and down.

Regarding the jogging stroller, there are many versions on the market. This figure illustrates the basic design of most. Typically, there are three wheels 25, much larger and more robust then the traditional walking stroller. A seat 26 made of nylon is common; the intent being comfortable but durable, collapsible, and quick drying. The jogging stroller frame 21 is typically of aluminum tube (strong but light weight), most often round, but sometimes square. This figure does not show a sun canopy. If one were to be included and shown in this figure, it would be retracted back near the stroller handle 24.

Figure 2:
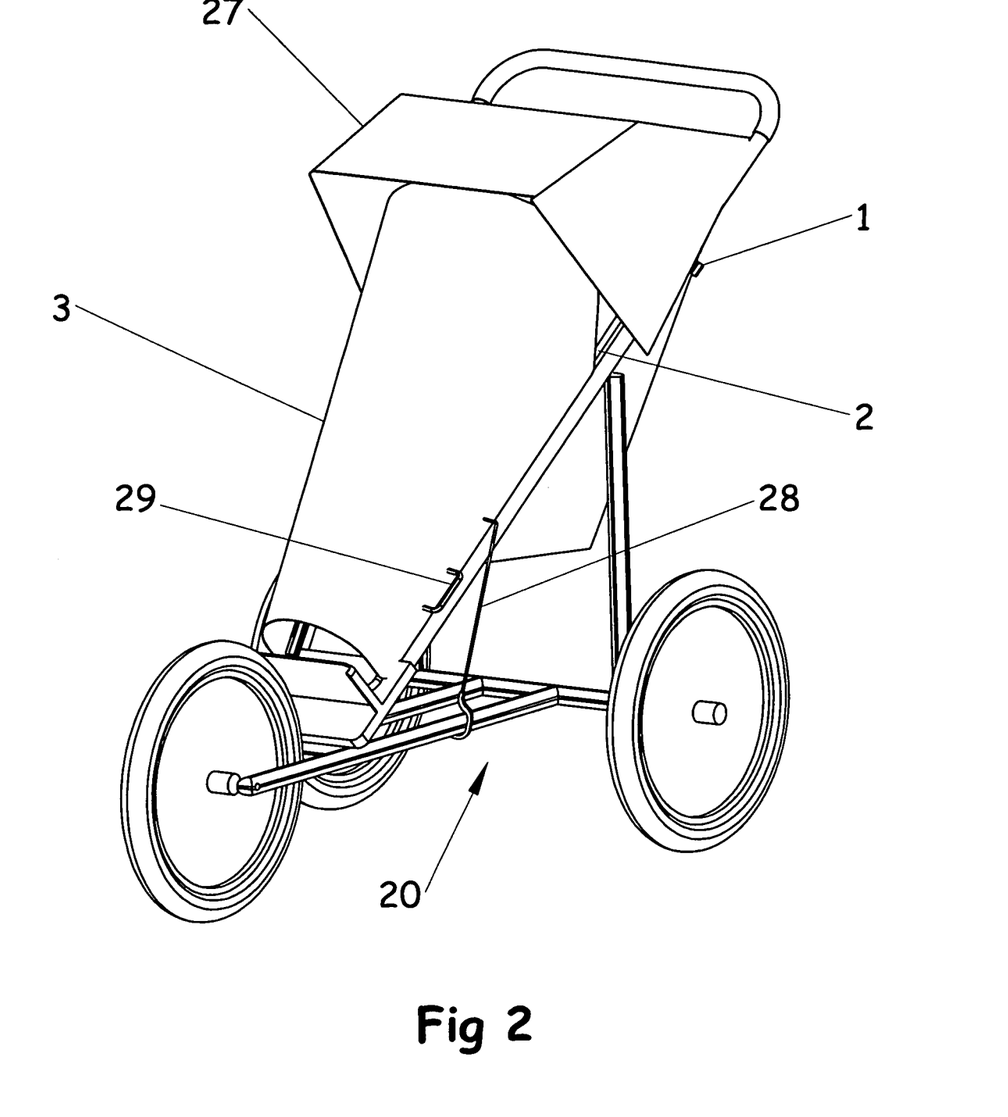
FIG. 2 is a perspective view of the present invention attached to a jogging stroller with a sun canopy, the invention shown in the jog (protective) position.

FIG. 2—Present Invention on Jogging Stroller, Jog Position

FIG. 2 shows the preferred embodiment in the down (closed) position. In this position, the occupant is protected from the elements. Most jogging strollers have an integral sun canopy 27. This figure illustrates a canopy in the extended-forward position, providing coverage for the occupant at the top of the shield. The shield is held in the down position with elastic cord and hook 28.

Figure 3:
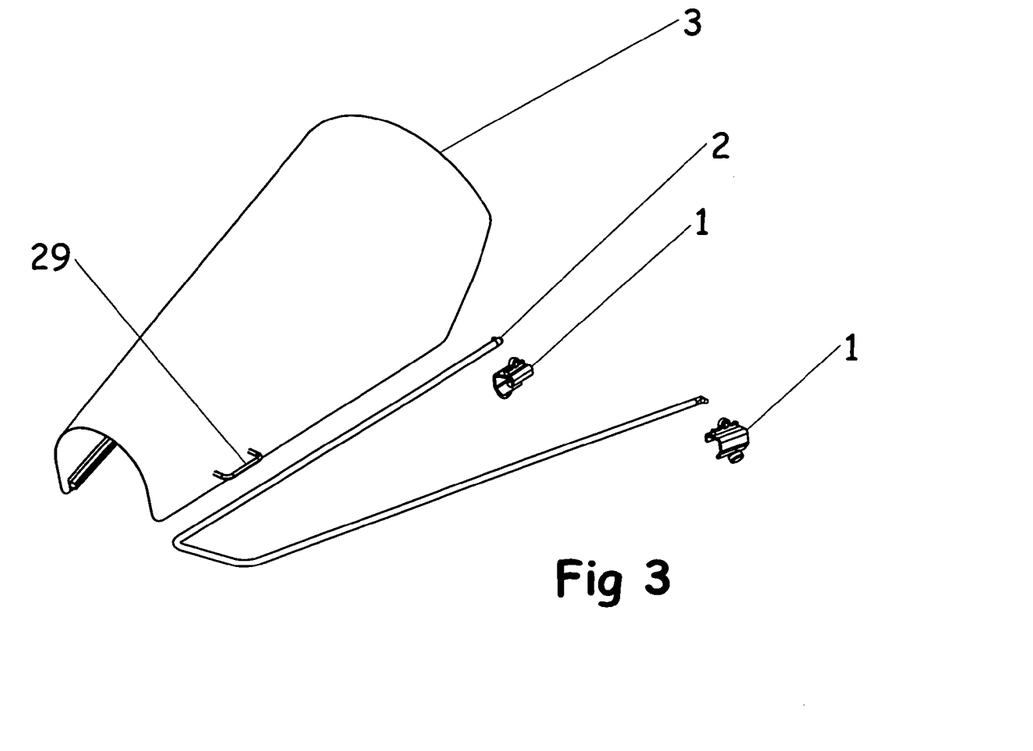
FIG. 3 is a disassembled perspective view of the present invention.

FIG. 3—Assemblies of Present Invention, Not Installed

This figure shows the three major assemblies of the present invention: the mounting hardware 1, the frame assembly 2, and the sheet assembly 3. When the sheet assembly is snapped onto the frame assembly, the two together will be referred to as "the shield". The mounting hardware fastens to the frame of the jogging stroller (not shown), and the shield quickly and easily fits into the mounting hardware. The shape of the frame assembly 2 matches the frame shape of the jogging stroller, such that when the shield is installed and in the closed position, a reasonable seal is obtained between the stroller and the shield.

Figure 4:
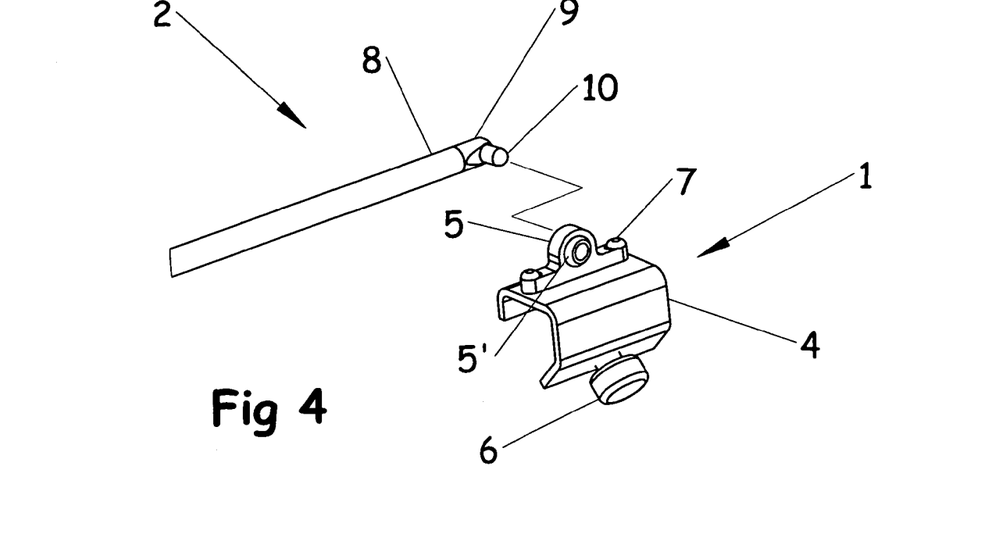
FIG. 4 is a disassembled perspective view showing in detail how the shield frame assembly fits into the mounting hardware.

FIG. 4—End Adaptor and Mounting Hardware

FIG. 4 shows how the shield fits into the mounting hardware 1. A pin 10 of the end adaptor 9 of the frame assembly 2 fits into the bearing 5 of the mounting hardware 1.

Figure 5:
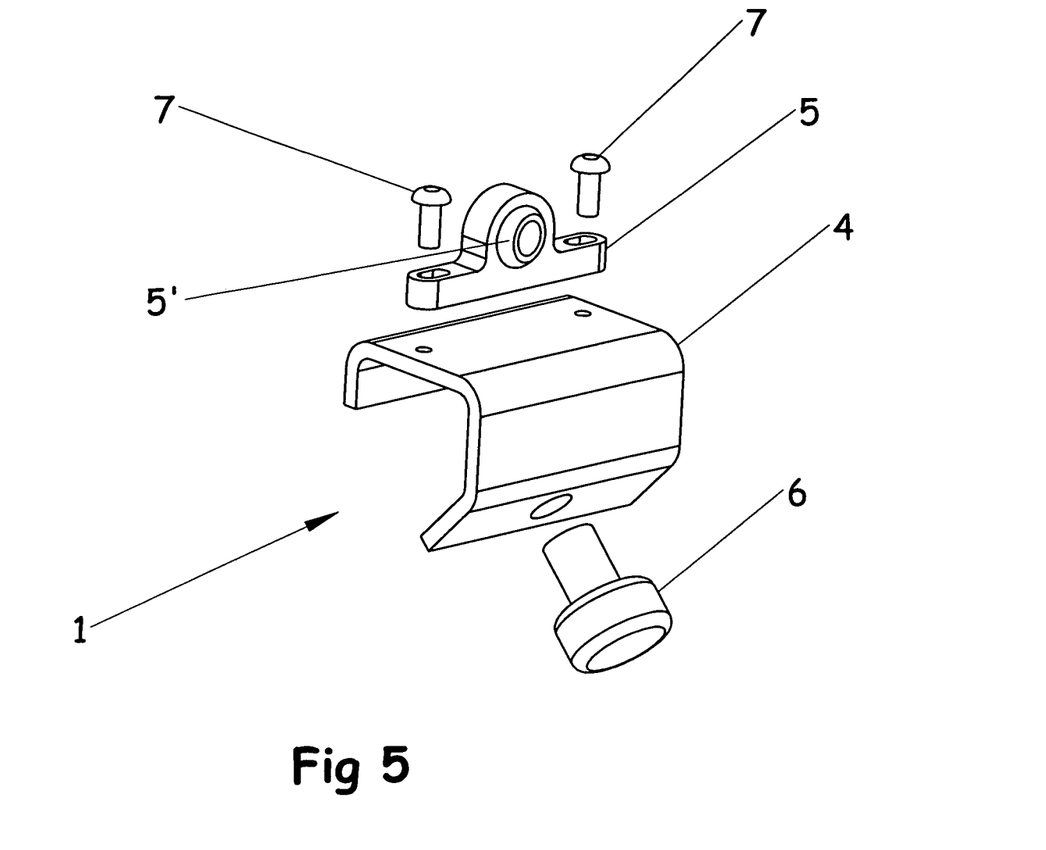
FIG. 5 is an exploded view of the mounting hardware.

FIG. 5—Mounting Hardware, Exploded View

This figure shows the components that comprise the mounting hardware 1. In this embodiment, the hardware 1 consists of a bracket 4, a securing screw 6 to tighten the bracket 4 onto the jogging stroller frame 21, a spherical bearing 5, and two screws 7 to fasten the bearing 5 to the bracket 4. The bearing 5 contains a "hole" in ball 5' into which the pin 10 of the shield 2, 3 enters to complete the pivoting joint. The spherical nature of the bearing accommodates both component and assembly tolerances in the stroller and the shield.

Figure 6:
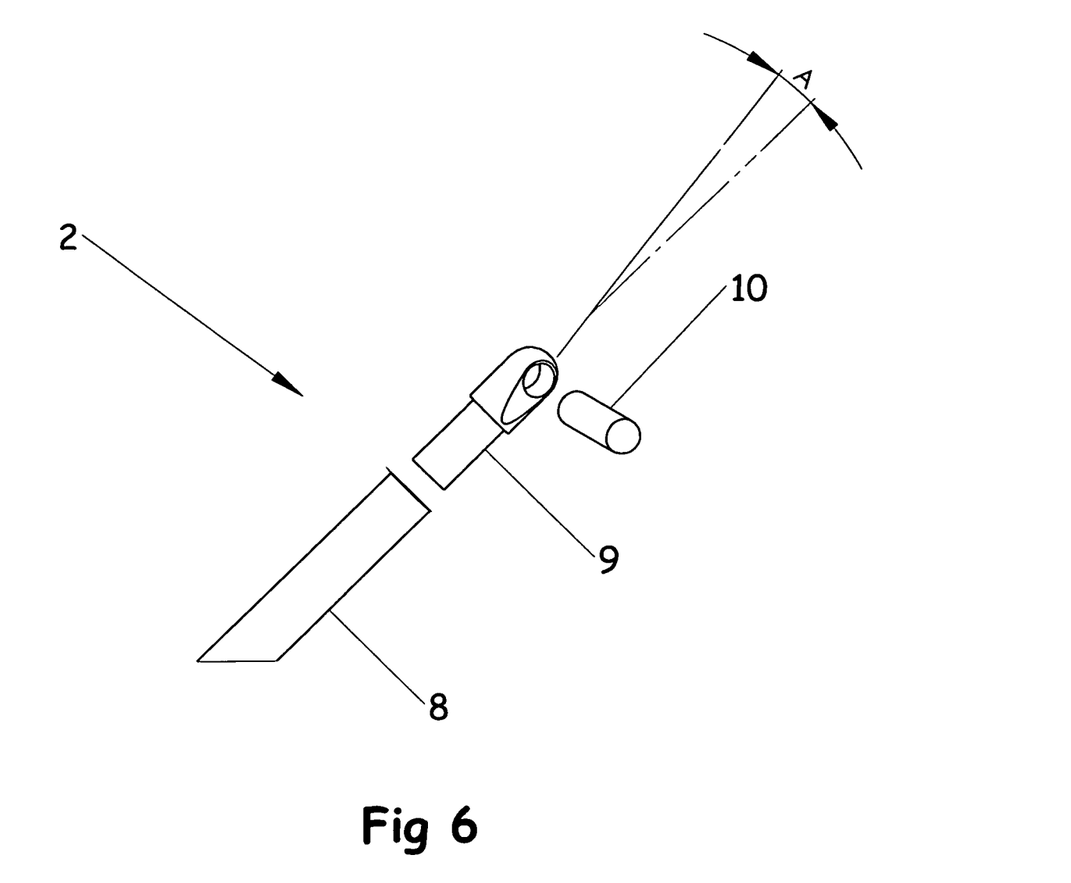
FIG. 6 is an exploded view of the end of the frame assembly.

FIG. 6—Frame Assembly—One End, Exploded View

This figure shows one end of the preferred frame assembly 2. The frame is a formed tube to match the shape of the jogging stroller frame 21. End adaptors 9 are secured to the tube at each end. The end-adaptor 9 contains a pin 10 that enters a mating "hole" in the mounting hardware 1, creating a pivot or pivoting means by which the shield can be lifted for the purpose of loading and unloading an occupant.

The pin 10 protrudes from one face of the end-adaptor 9 at an angle A. The angle A is chosen such that the centerline of this pin 10 and the centerline of the pin on the opposite end-adaptor (not shown) coincide. The coinciding centerlines create the pivoting centerline of rotation about which the shield is raised and lowered.

Figure 7:
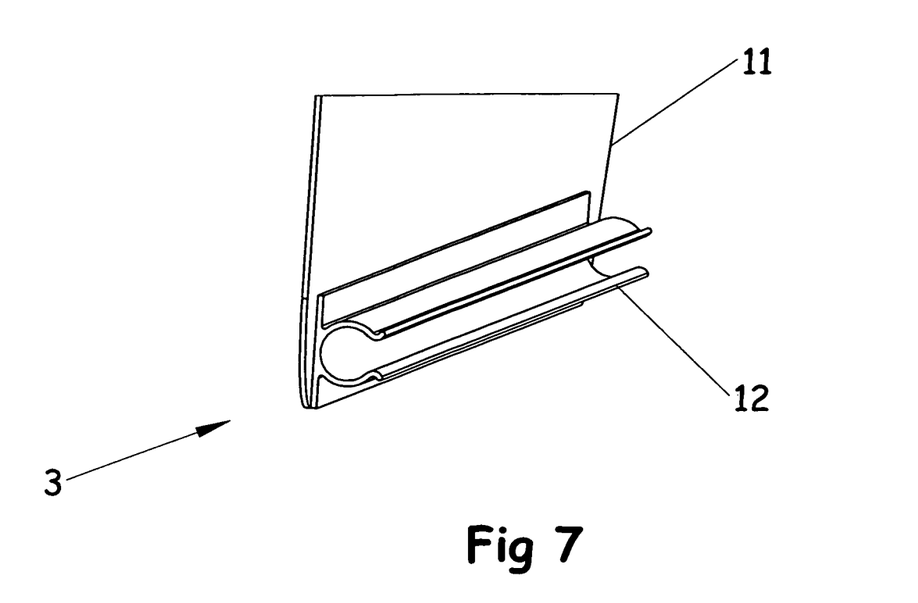
FIG. 7 is a partial perspective view of a detail of a sheet assembly.

FIG. 7—Sheet Assembly Detail, Polycarbonate Sheet with Clip-Strip

This figure shows a detail of a semi-rigid plastic sheet 11 with a bonded clip-strip 12; together referred to as sheet assembly 3. The clip-strip 12 is bonded to the two long edges 15, 16 of the sheet 11 (see FIG. 8). The clip-strip 12 is radially spring-like, allowing it to expand as it is pressed onto the frame assembly 2. This spring-like characteristic also maintains a snug fit, preventing the sheet assembly 3 from moving on the frame assembly 2. Note that no tool is required to attach the sheet assembly 3 to the frame assembly 2.

Figure 8:
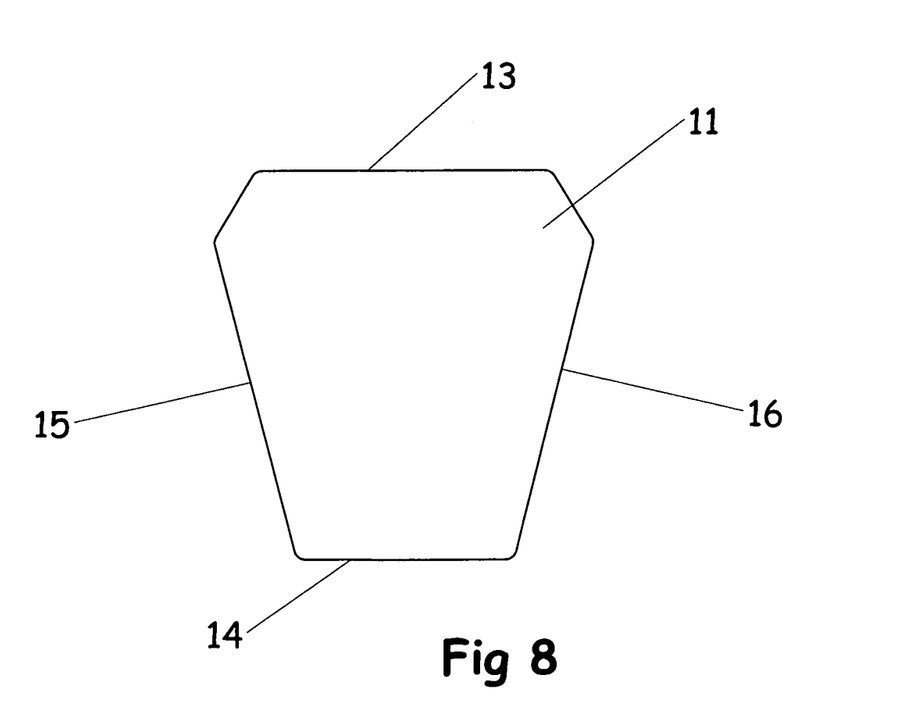
FIG. 8 is a planar view of the semi-rigid plastic sheet in an unconstrained state.

FIG. 8—Sheet, Flat View

FIG. 8 shows the polycarbonate sheet 11 in the flat, unconstrained state.

The preferred embodiment of the present invention is illustrated in the perspective view of FIG. 1. The present invention includes mounting hardware 1, frame assembly 2, and sheet assembly 3. Note that when sheet assembly 3 is snapped onto frame assembly 2, they are (together) referred to as "the shield". The shield secures to jogging stroller 20 using mounting hardware 1. The combination of the shield and mounting hardware 1 is referred to as "the shield assembly". Hardware 1 attaches to jogger side-frame members 21. Pin 10 on frame assembly 2 (FIG. 4) inserts into a "hole" in bearing 5 which is part of mounting hardware 1. The pin in the hole creates a pivoting joint about which the shield rotates up and down. Bearing 5 is a pivot bearing.

Frame assembly 2 and sheet assembly 3 are somewhat compliant, and nominally wider apart at the pins than the distance between the installed mounting hardware. The shield must be slightly compressed to fit inside the mounting hardware 1. When released into the bearings of hardware 1, the shield is held in place by its tendency to "spring back" open. To remove the shield from mounting hardware 1, a slight compressive force applied to frame assembly 2 near hardware 1 frees the shield from the mounting hardware. The shield is compliant to a compressive force and compressed to fit in the mounting hardware when secured to a stroller. The compressed fit creates a geometric arch in the material of the shield that adds to resistance to external forces. External forces may be the elements or environmental conditions such as wind, rain, snow and debris. The geometric arch provides protection from such external forces.

The sheet assembly 3 is resilient and is flexed to be secured in/on frame assembly 2. The sheet assembly then remains in a flexed state or state of compression. The sheet assembly 3 is compliant to a compressive force and compressed to fit in/on the frame assembly 2, the compressed fit creating a geometric arch in the material that adds to resistance to external forces.

The shape of frame assembly 2 also creates the constraint for sheet assembly 3 to achieve the desired domed shape as observed in FIGS. 1 and 2. The dome shape accomplishes two goals: 1) adequate space is created for the occupant to move about freely in the seat, and 2) a geometric arch is created in the sheet that makes the shield resistant to collapse under the load of wind, rain, snow, or road debris.

The shield is flexed to be attached in the mounting hardware 1 and remains in a flexed state or state of compression.

The shield is held up with an elastic cord and hook 28. Alternatively, the shield could be held up by the following modifications: 1) pin 10 and ball 5' are configured such that there is no relative motion between them when the pin is inserted into the ball, and 2) an interface between bearing 5 and ball 5' is created such that friction (constant or variable) is achieved. This friction serves to resist motion in the pivoting joint, thus holding the shield in whatever position it is put.

The basic design of jogging stroller 20 is shown in FIG. 1. Typically, there are three wheels 25, much larger and more robust then the traditional walking stroller wheels. A seat 26 made of nylon is common, the intent being comfortable but durable, collapsible, and quick-drying. The stroller frame (items 21, 22, 24, and the lower wheel structure 23) is typically of ⅞" diameter aluminum tube (strong but light weight). Square-tube designs have also been marketed. This figure does not show a sun canopy. Most jogging strollers come with a removable or retractable canopy. In the installed (and extended forward) position, the canopy typically extends from the handle 24 region, horizontally over the occupant's head, attaching finally to side-frame members 21 (see FIG. 2).

FIG. 2 shows the shield in the down (closed) position. This is also a sealed protective position. In this position, the occupant is protected from the elements. Once down, jogger canopy 27 may be extended forward to seal the top (nearest the occupant's head). In an alternative embodiment (for jogging strollers without canopies) a nylon-like material is bonded to sheet assembly 3 at the top edge, and tied to handle 24. This completes the seal at the top. The shield substantially seals an occupant space from outdoor conditions or elements.

To hold the shield securely in the down position, the hook of elastic cord and hook 28 is attached to lower frame member 23 (FIG. 1) of jogging stroller 20. Alternatively, the shield could be held down by the following modifications: 1) pin 10 and ball 5' are configured such that there is no relative motion between them when the pin is inserted into the ball, and 2) an interface between bearing 5 and ball 5' is created such that friction (constant or variable) is achieved. This friction serves to resist motion in the pivoting joint, thus holding the shield in whatever position it is put.

FIG. 3 shows the three major assemblies of the present invention: mounting hardware 1, frame assembly 2, and sheet assembly 3. When sheet assembly 3 is snapped onto frame assembly 2, the two together will be referred to as "the shield". Mounting hardware 1 fastens to jogging stroller frame members 21 (see FIG. 1). The shield and the mounting hardware 1 in combination are referred to as "the shield assembly". Frame assembly 2 must be slightly compressed to fit into hardware 1 after hardware 1 has been installed on the jogging stroller. The shape of frame assembly 2 matches the shape of the stroller frame such that when the shield is installed and in the down position, tube 8 (FIG. 6) of frame assembly 2 lies adjacent to side-member 21 of stroller 20, creating a reasonable seal between the stroller and the shield.

FIG. 4 is a detail of frame assembly 2 (one end), and mounting hardware 1. End adaptor 9 fastens to tube 8. Pin 10 is secured to end adaptor 9. Pin 10 is slightly smaller (in diameter) than the inner race of spherical bearing 5. When the shield is installed, pin 10 rotates in bearing 5, allowing the shield to pivot up and down.

Bearing 5 is fastened to bracket 4 with two screws 7. Screw 6 secures bracket 4 to jogger frame member 21 (FIG. 1). Screw 6 is non-ferrous to prevent damage to stroller frame 21. Alternatively, screw 6 could be ferrous with a non-ferrous tip. Bracket 4 is formed and threaded such that the centerline of screw 6 bisects the opposite vertex in bracket 4.

FIG. 5 is an exploded view of mounting hardware 1. Two screws 7 fasten bearing 5 to bracket 4. Other forms of fasteners such as rivets could be used to fasten the bearing to the bracket. Screw 6 threads into bracket 4, "pinching" bracket 4 onto jogging stroller frame member 21.

Screw 6 threads into bracket 4, "pinching" bracket 4 onto jogging stroller frame member 21. Bracket 4 has a "C" shape (or has an "open side") to allow clamping on stroller frame member 21 which is wrapped by the edges of material of nylon seat 26. Bearing 5 has a spherical component (rotating ball) with a "hole" through it. The rotating nature of spherical bearing 5 accommodates component and assembly tolerances. The hole receives pin 10.

FIG. 6 is an exploded view of one end of frame assembly 2. End-adaptor 9 has one end turned down to fit within the end of tube 8. The other end has a flat face and hole to receive pin 10. The flat face is at some angle A relative to the axis of the end-adaptor such that the centerlines of pin 10 on each end of frame assembly 2 coincide. These coinciding centerlines create the axis of rotation about which the shield is pivoted up and down.

FIGS. 7 and 8 show in detail sheet assembly 3. Sheet assembly 3 consists of polycarbonate sheet 11, two clips such as two pieces of clip-strip 12, and edge trim 13 and 14. The sheet 11 is a semi-rigid substantially see-through material not subject to wrinkles or creases that impair visibility. Clip-strip 12 is bonded to the inside of sheet 11, along edges 15 and 16 that make up the sides of the shield (see FIGS. 7 and 8). Edge trim 13 and 14 are bonded to the edges that make up the top and bottom of sheet 11, respectively. Edge trim 13 and 14 provides a protective cover to the edge of sheet 11, and an esthetic finish to the shield.

Clip-strip 12 has a profile including a bonding flat and an inner diameter (FIG. 7). The bonding flat provides a surface for bonding clip-strip 12 to sheet 11. There are many ways to bond the clip-strip to the frame. The preferred embodiment uses a foam-backed pressure sensitive adhesive (PSA). The inner diameter is selected to achieve a snug fit on frame assembly 2. The snug fit over the length of the frame creates a secure attachment between the sheet 3 and the frame assembly 2. An opening with lead-in tabs allows the clip-strip to be pressed onto the frame assembly 2. The material of clip-strip 12 is selected to be flexible, and to have the characteristic of a spring. This characteristic allows the clip-strip to be "snapped" onto frame assembly 2.

When sheet assembly 3 is separated from frame assembly 2, sheet assembly 3 extends flat as sheet 11 relaxes to a zero-energy (unconstrained) state (FIG. 8). It is this tendency to return to a zero-energy state that generates the geometric arch in sheet 11 when it is constrained on frame assembly 2. The geometric arch gives the sheet assembly the resistance to collapse under the normal loads of wind, rain, snow, or road debris.

Sheet 11 has a lower edge, an upper edge, two long side edges and two shorter side edges. The upper and lower edges become radiused when sheet assembly 3 is constrained on frame assembly 2. The lower radius will cover the stroller occupant's feet. The upper radius will cover the occupant's head. The long side-edges become the sides of the shield where clip-strip 12 is bonded. The short side-edges (optional) provide clearance for existing stroller hardware.

The invention contemplates a method of providing protection for an occupant of a jogging stroller, comprising: shielding the occupant with a semi-rigid substantially see-through material, the material not subject to wrinkles or creasing. The shield substantially seals an occupant space from outdoor conditions.

The invention further contemplates a method of shielding an occupant of a jogging stroller, comprising: simultaneously compressing a sheet assembly of a semi-rigid substantially see-through material onto a frame assembly; creating a geometric arch in the material; and adding to resistance to external forces which may be the elements such as wind, rain, snow and debris. The shield substantially seals an occupant space from outdoor conditions.

In addition, the invention contemplates a method of shielding an occupant of a jogging stroller, comprising: simultaneously compressing a shield with a semi-rigid substantially see-through material into mounting hardware secured to a jogging stroller; creating a geometric arch in the material; and adding to resistance to external forces which may be the elements such as wind, rain, snow and debris. The shield substantially seals an occupant space from outdoor conditions.

While particular embodiments of the present invention have been described, it will be apparent to those skilled in the art that changes and modifications may be made without departing from this invention in its broader aspect and, therefore, the appended claims are to encompass within their scope all such changes and modifications that fall within the true spirit and scope of this invention. Changes and modifications contemplated are discussed below.

Alternative Embodiments

Mounting hardware 1 could contain the equivalent of pin 10, and frame assembly 2 could contain the corresponding "hole".

Mounting hardware 1 could be configured to attach to vertical member 22 of jogger 20 (FIG. 1), rather than side member 21. Further, the "pin" could be on either the frame or the bracket assembly, with the "hole" on the mating component.

Mounting hardware 1 (or some variation thereof) could be integrated into the existing hardware of the jogging stroller, reducing the present invention to the frame assembly and sheet assembly.

The shield need not fasten to stroller 20 in a pivoting fashion. Hardware 1 could be configured to accept the shield in a "snap-on" and "snap-off" fashion. The shield would be completely removed from stroller 20 to load or unload the occupant.

The shield need not fasten to stroller 20 in a pivoting fashion, and need not require mounting brackets. The shield could be modified to snap directly onto the frame of stroller 20. The shield would be completely removed from stroller 20 to load or unload the occupant.

The shield need not pivot at the top. It could also pivot on either side, or at the bottom.

The pivoting mechanism could include a spring and/or detent device to achieve alternative or additional hold-open and/or hold-close force.

The shield may be made with any semi-rigid see-through, transparent or translucent plastic. The preferred material is polycarbonate due to its excellent impact resistance, and good light transmitting properties. Polycarbonate also provides some scratch resistance.

The shield may be shaded 6r colored. It may have a tinted or reflective coating to reduce glare from sun, and/or improve scratch resistance. Any type of coating for polarization may be used. Any means of protecting vision from the sun such as used for sun glasses may be used for the sheet assembly.

The shield may include a variety of decals, reflectors or reflective stripping. The reflectors or reflective stripping may be for safety or otherwise.

The shield may have ventilation holes or slots, or means for forced ventilation.

The shield may have provision for ease of hanging or storing.

The shield may have means to secure an extension cover at its top and bottom, to provide additional protection to the occupants head and feet.

The shield may have means for providing a source of heat.

The shield may have a thermometer (or any temperature indicator).

The frame and hardware of the shield may be made of any material and color. The preferred materials are lightweight aluminum, stainless steel, and/or thermoplastic. These materials offer a combination of corrosion resistance and lightweight strength.

End adaptor 9 may be without a face (have angle A=0). This embodiment has the pivoting centerline of rotation achieved by the ball in spherical bearing 5.

It is to be understood that the present invention is not limited to the sole embodiments described above, but encompasses all embodiments within the scope of the following claims.

I claim:

1. A shield for a jogging stroller, comprising:
a frame assembly;
a semi-rigid substantially see-through material,
said material not subject to wrinkles or creasing,
said material compressed to fit in said frame assembly, the compressed fit creating a geometric arch in said material even when said shield is not on said jogging stroller;
said shield maintaining an arched shape and said frame assembly providing a stable arched structure even when said shield is not on said jogging stroller.

2. The shield of claim 1, further comprising:
said frame assembly having rigid support structures along the length of the shield from the stroller occupant's head to feet and from the top to the bottom of the shield, one said support structure on each side of the shield, providing stability against the elements.

3. The shield of claim 1, further comprising:
a sheet assembly of said material;
said sheet assembly further comprising a clip.

4. The shield of claim 3, wherein:
said clip secures said sheet assembly to said frame assembly.

5. The shield of claim 4, further comprising:
said clip securing said sheet assembly to said frame assembly in a flexed state.

6. A jogging stroller having a shield according to claim 1.

7. A shield assembly for a jogging stroller, comprising a shield comprising
a frame assembly;
a semi-rigid substantially see-through material,
said material not subject to wrinkles or creasing,
said material compressed to fit in said frame assembly, the compressed fit creating a geometric arch in said material even when said shield is not on said jogging stroller;
said shield maintaining an arched shape and said frame assembly providing a stable arched structure even when said shield is not on said jogging stroller.

8. The shield assembly of claim 7, further comprising:
mounting hardware.

9. The shield assembly of claim 8, wherein said mounting hardware permits easy attachment and detachment of said shield to said jogging stroller.

10. The shield assembly of claim 9, wherein said attachment and detachment of said shield to said jogging stroller is in a non-destructive manner.

11. The shield assembly of claim 8, wherein said mounting hardware comprises a pivot bearing for pivoting said shield between an open position and a protective position.

12. The shield assembly of claim 11, wherein said pivot bearing permits easy loading and unloading of the jogging stroller.

13. The shield assembly of claim 8, further comprising:
said shield compliant to a compressive force and compressed to fit in said mounting hardware when secured to said jogging stroller, the compressed fit creating a geometric arch in said material of said shield that adds to resistance to external forces.

14. The shield assembly of claim 7, wherein said shield has a handle for moving said shield between an open position and a protective position, and elastic cord with hook to hold shield in either position.

15. The shield assembly of claim 7, further comprising:
the compressed fit creating a geometric arch in said material adding to resistance to external forces.

16. A shield for a jogging stroller, comprising:
a sheet assembly of a semi-rigid substantially see-through material; and
a frame assembly;
said sheet assembly compliant to a compressive force and compressed to fit on said frame assembly, the compressed fit creating a geometric arch in said material even when said shield is not on said jogging stroller that adds to resistance to external forces.

17. The shield according to claim 16, wherein said material is not subject to wrinkles or creasing.

18. A jogging stroller having a shield according to claim 16.

19. A shield assembly for a jogging stroller, comprising a shield comprising
a sheet assembly of a semi-rigid substantially see-through material; and
a frame assembly;
said sheet assembly compliant to a compressive force and compressed to fit on said frame assembly, the compressed fit creating a geometric arch in said material even when said shield is not on said jogging stroller that adds to resistance to external forces.

20. The shield assembly of claim 19, further comprising, mounting hardware.

21. The shield assembly of claim 20, wherein said mounting hardware permits easy attachment and detachment of said shield to said jogging stroller.

22. The shield assembly of claim 21, wherein said attachment and detachment of said shield to said jogging stroller is in a non-destructive manner.

23. The shield assembly of claim 20, wherein said mounting hardware comprises a pivot bearing for pivoting said shield between an open position and a protective position.

24. A method of providing protection for an occupant of a jogging stroller, comprising:
shielding said occupant with a semi-rigid substantially see-through material,
said material not subject to wrinkles or creasing
compressing said material to fit in a frame assembly, the compressed fit creating a geometric arch in said material even when said shield is not on said jogging stroller;
maintaining said shield in an arched shape by said frame assembly; and
said frame assembly providing a stable arched structure even when said shield is not on said jogging stroller.

25. A method of shielding an occupant of a jogging stroller, comprising:
simultaneously compressing a sheet assembly of a semi-rigid substantially see-through material onto a frame assembly;
creating a geometric arch in said material by creating a shield that maintains an arched shape even when not on said jogging stroller; and
adding to resistance to external forces.

26. The method of shielding an occupant of a jogging stroller according to claim 25, further comprising:
simultaneously compressing said shield with a semi-rigid substantially see-through material into mounting hardware secured to said jogging stroller;
creating additional geometric arch in said material; and
adding to resistance to external forces.

* * * * *